(12) United States Patent
Kos et al.

(10) Patent No.: US 7,357,233 B2
(45) Date of Patent: Apr. 15, 2008

(54) TORQUE CONVERTER WITH A LOCK-UP CLUTCH ASSEMBLY HAVING A FLOATING FRICTION DISK

(75) Inventors: Thomas Kos, Orland Park, IL (US); Anthony Grzesiak, Sauk Village, IL (US); Andrew Horner, St. John, IN (US)

(73) Assignee: BorgWarner Inc., Auburn Hills, MI (US)

( * ) Notice: Subject to any disclaimer, the term of this patent is extended or adjusted under 35 U.S.C. 154(b) by 218 days.

(21) Appl. No.: 11/180,060

(22) Filed: Jul. 13, 2005

(65) Prior Publication Data

US 2006/0180423 A1  Aug. 17, 2006

Related U.S. Application Data

(63) Continuation-in-part of application No. 11/058,536, filed on Feb. 15, 2005, now abandoned.

(51) Int. Cl.
*F16H 45/02* (2006.01)
*F16D 13/68* (2006.01)

(52) U.S. Cl. ............. 192/3.29; 192/107 R; 192/113.36

(58) Field of Classification Search ...................... None
See application file for complete search history.

(56) References Cited

U.S. PATENT DOCUMENTS

| 2,304,721 | A | 12/1942 | Werther |
| 2,429,503 | A | 10/1947 | Zeidler |
| 2,660,957 | A | 12/1953 | Koskinen |
| 2,839,950 | A | 6/1958 | Russell |
| 2,963,867 | A | 12/1960 | Amiard |
| 3,385,060 | A | 5/1968 | Lazarus |
| 3,507,118 | A | 4/1970 | Yamaguchi et al. |
| 3,665,707 | A | 5/1972 | Koivunen ........................ 60/54 |
| 3,888,082 | A | 6/1975 | Haide ............................ 60/361 |
| 4,086,766 | A | 5/1978 | Stieger ......................... 60/330 |
| 4,155,222 | A | 5/1979 | Ahlen .......................... 60/361 |
| 4,441,315 | A | 4/1984 | Bochot ......................... 60/345 |
| 4,510,747 | A | 4/1985 | Yoshida ........................ 60/343 |
| 4,608,823 | A | 9/1986 | Maze ........................... 60/361 |
| 4,674,616 | A | 6/1987 | Mannino, Jr. ........... 192/113.36 |
| 4,726,185 | A | 2/1988 | Shigemasa et al. ........... 60/361 |
| 4,969,543 | A | 11/1990 | Macdonald ................. 192/3.29 |
| 4,986,397 | A | 1/1991 | Vierk .......................... 192/3.3 |
| 5,040,647 | A * | 8/1991 | Ratner ........................ 192/3.28 |

(Continued)

*Primary Examiner*—Rodney H. Bonck
(74) *Attorney, Agent, or Firm*—Bliss McGlynn, P.C.

(57) ABSTRACT

The torque converter includes a torque input member and an impeller assembly operatively coupled with the torque input member. A turbine assembly is connected with the impeller and a lock-up clutch is interposed between the turbine assembly and the torque input member. The lock-up clutch provides torque translation between the torque input member and the turbine assembly and includes an annular piston mounted to the turbine assembly and a friction plate movably supported relative to the annular piston and operatively disposed between the annular piston and torque input member. A first friction member is operatively disposed between the friction plate and the torque input member, and a second friction member is operatively disposed between the friction plate and the annular piston. Torque is translated from the torque input member through the first friction member, the friction plate, the second friction member, and the annular piston to the turbine assembly.

17 Claims, 7 Drawing Sheets

U.S. PATENT DOCUMENTS

| | | | |
|---|---|---|---|
| 5,056,631 A | 10/1991 | Macdonald | 192/3.29 |
| 5,168,702 A | 12/1992 | Sakakibara et al. | 60/345 |
| 5,224,348 A | 7/1993 | Ejiri | 60/361 |
| 5,271,716 A | 12/1993 | Ejiri | 416/180 |
| 5,279,118 A | 1/1994 | Hara et al. | 60/365 |
| 5,282,362 A | 2/1994 | Renneker et al. | 60/345 |
| 5,313,793 A | 5/1994 | Kirkwood et al. | 60/361 |
| 5,337,867 A | 8/1994 | Kirkwood | 192/3.29 |
| 5,377,562 A | 1/1995 | Kitagawa et al. | 477/110 |
| 5,522,220 A | 6/1996 | Locker | 60/361 |
| 5,566,802 A | 10/1996 | Kirkwood | 192/3.29 |
| 5,669,474 A | 9/1997 | Dehrmann et al. | 192/3.29 |
| 5,738,198 A | 4/1998 | Walth et al. | 192/113.36 |
| 5,799,762 A * | 9/1998 | Hinkel et al. | 192/3.29 |
| 5,799,763 A | 9/1998 | Dehrmann | 192/3.29 |
| 5,819,896 A | 10/1998 | Fallu | 192/3.29 |
| 5,878,860 A | 3/1999 | Pavangat et al. | 192/107 |
| 6,000,510 A | 12/1999 | Kirkwood et al. | 192/3.29 |
| 2005/0126877 A1* | 6/2005 | Schneider et al. | 192/107 M |

* cited by examiner

TORQUE CONVERTER WITH A LOCK-UP CLUTCH ASSEMBLY HAVING A FLOATING FRICTION DISK

CROSS-REFERENCE TO RELATED APPLICATION

The present application is a continuation-in-part of U.S. patent application Ser. No. 11/058,536, filed Feb. 15, 2005, now abandoned entitled "Torque Converter With A Lock-Up Clutch Assembly Having A Floating Friction Disk."

BACKGROUND OF THE INVENTION

1. Field of the Invention

The present invention relates, generally, to a torque converter having a clutch assembly, and, more specifically, to a torque converter having a lock-up clutch assembly that includes a floating friction disk.

2. Description of the Related Art

In automotive applications, engine torque and speed are translated between a prime mover, such as an internal combustion engine, to one or more wheels through the transmission in accordance with the tractive power demand of the vehicle. Hydrokinetic devices, such as torque converters, are often employed between the internal combustion engine and its associated transmission for transferring kinetic energy therebetween.

As illustrated schematically in FIG. 1, torque converters 10 include impeller assemblies 12 operatively connected for rotation with the torque input from the internal combustion engine, a turbine assembly 14 fluidly connected in driven relationship with the impeller assembly and a stator or reactor assembly 16. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly 16 of a conventional torque converter is locked against rotation in one direction but is free to spin about an axis in the direction of rotation of the impeller assembly 12 and turbine assembly 14. When the stator assembly 16 is locked against rotation, the torque is multiplied by the torque converter. During torque multiplication, the output torque is greater than the input torque for the torque converter.

Conventional torque converters often employ clutches interposed between a torque input member and the turbine assembly which are engaged and "lock up" at high speed ratios ($N_2/N_1$) of between 0.88-0.98, where $N_1$ is the rotational speed input to the converter and $N_2$ is the rotational speed output from the converter. When the "lock-up" clutch is locked there is a direct torque translation between the torque input member and the transmission through the turbine assembly. Conventional lock-up clutches are generally engaged only after the torque converter has reached a predetermined speed. The locked lock-up clutch eliminates the slip inherent with the fluid coupling and results in an efficiency gain for the torque converter. Depending on throttle position and shift strategy, this may occur at vehicle speeds of between 40 and 45 mph.

As noted above, lock-up clutches are typically located between the turbine assembly and the front torque converter member or cover. The lock-up clutch includes an annular piston or disc that is rotatably supported on the turbine assembly. A frictional material or facing element is bonded to either the outer face of the annual piston or the front cover member. Thus, the frictional material is bonded to one member in angular sliding contact with the other. The frictional material is specifically chosen with a particular co-efficient of fiction to provide lock-up at a predetermined torque load. The torque load at which the lock-up clutch locks may also be influenced by the formation of circuitous grooves cut into the frictional material that allows a flow of hydraulic fluid along the grooves for cooling as indicated in U.S. Pat. Nos. 5,566,802 and 6,000,510. Both of these patents are assigned to the assignee of the present invention and their disclosures are incorporated herein by reference.

Directly applying the friction material to the front cover member of the torque converter has been known to present certain assembly and operational drawbacks. Bonding a ring of delicate friction material having grooved recesses on the inner face of the cover member without damage or misalignment is problematic. Placing friction material in the cover member also requires additional machining steps to be performed on the interior of the cover member to establish the bonding surface. Conversely, applying the friction material to the annular piston has certain drawbacks as well. Specifically, torque converters are often constructed in a series of steps that may occur at different physical locations and during different points in the overall construction of the transmission. If the friction material is bonded to the annular piston of the torque converter, this must be done somewhat early in the transmission assembly process. This exposes the delicate frictional material to damage throughout the remainder of the assembly of the transmission that may possibly cause early failure of the torque converter. Even if the frictional material does not suffer significant damage, small impacts or nicks can change the design performance of the lock-up clutch causing operational inconsistencies.

In an attempt to overcome these assembly drawbacks, it is known to provide a friction plate having frictional material bonded to it that is then welded into the torque converter assembly. This type of friction plate may be located between the annular piston and the input member or front torque converter cover as indicated in U.S. Pat. No. 5,878,860. The '860 patent is assigned to the assignee of the present invention and its disclosure is incorporated herein by reference. As noted above, the friction plate is welded to the annular piston of the torque converter typically late in the transmission assembly process so that its exposure to assembly damage is minimized.

While torque converters having a lock-up clutch assembly of the type generally known in the related art have preformed reasonably well for their intended purposes, some disadvantages remain. More specifically, torque converters remain complex devices that take numerous assembly steps and are costly and time consuming to produce. When a friction plate for the lock-up clutch is employed, it must still be welded to the annular piston about its outer edge in close proximity to the frictional material. This again subjects the friction material to possible damage and may cause undetected heat warping of the plate. Furthermore, the assembly of this type of fixed friction plate requires extremely accurate placement and alignment against the annular piston prior to and during the welding procedure. Any misalignment will cause improper operation of the lock-up clutch and uneven wear in the friction material since the welded and fixed friction plate will not be able to account for the misalignment. Finally, the friction plates of conventional torque converter lock-up clutches are full disc-shaped plates that are operatively supported at their inner diameter by a shaft or bushing of the torque converter. A full size friction plate is employed to help counter any distortions that may be imparted to the friction plate during its welding to the annular piston. However, employing a full size friction plate adds additional rotating mass and inertia within the torque converter adding parasitic drain, thereby decreasing torque converter efficiency and adding to operational costs.

Thus, there remains a need in the art for a torque converter having a lock-up clutch assembly that employs a friction plate that may be easily constructed in a separate process to protect the bonded friction material, and that may be easily inserted into and retained within the torque converter during assembly. In addition, there remains a need in the art for such a torque converter that employs a friction plate that is not fixed to the annular piston and is capable of accounting for wear and misalignment within the torque converter. Finally, there remains a need in the art for such a torque converter that has a friction plate that results in reduced weight and reduced parasitic losses and thus improves torque converter efficiency.

SUMMARY OF THE INVENTION

The disadvantages of the related art are overcome by a torque converter of the present invention having a lock-up clutch for translating torque between a prime mover and a transmission. The torque converter includes a torque input member and an impeller assembly operatively coupled for rotation with the torque input member. A turbine assembly is fluidly connected in driven relationship with the impeller assembly and a lock-up clutch assembly is interposed between the turbine assembly and the torque input member. The lock-up clutch assembly is adapted to provide torque translation between the torque input member and the turbine assembly. The lock-up clutch assembly includes an annular piston mounted to the turbine assembly and a friction plate movably supported relative to the annular piston and operatively disposed between the annular piston and torque input member. A first friction member is operatively disposed between the friction plate and the torque input member, and a second friction member is operatively disposed between the friction plate and the annular piston. The torque provided by the torque input member is translated from the torque input member through the first friction member, the friction plate, the second friction member, and the annular piston to the turbine assembly.

In this manner, the costly and inefficient manufacturing and operational approaches of the prior art with regard to torque converter assemblies having a lock-up clutch are overcome by the present invention that employs a floating friction plate with two friction members. The torque converter of the present invention having a floating friction plate with two separate friction members may be easily constructed in a separate process to protect the bonded friction material and can be installed in the transmission late in the assembly process, which allows much improved protection of the bonded friction material. Further, the friction plate of the present invention is movably supported relative to the annular piston without welding and is floated between the elements of the locking clutch to prevent exposing the friction material to damage or misalignment. In addition, since the floating friction plate of the present invention is not fixed to the annular piston, it is capable of accounting for wear and misalignment within the torque converter. Finally, the floating friction plate of the torque converter of the present invention is a flat annular ring and not a full disc, which has greatly reduced mass to reduce parasitic losses and improve torque converter efficiency.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 2:
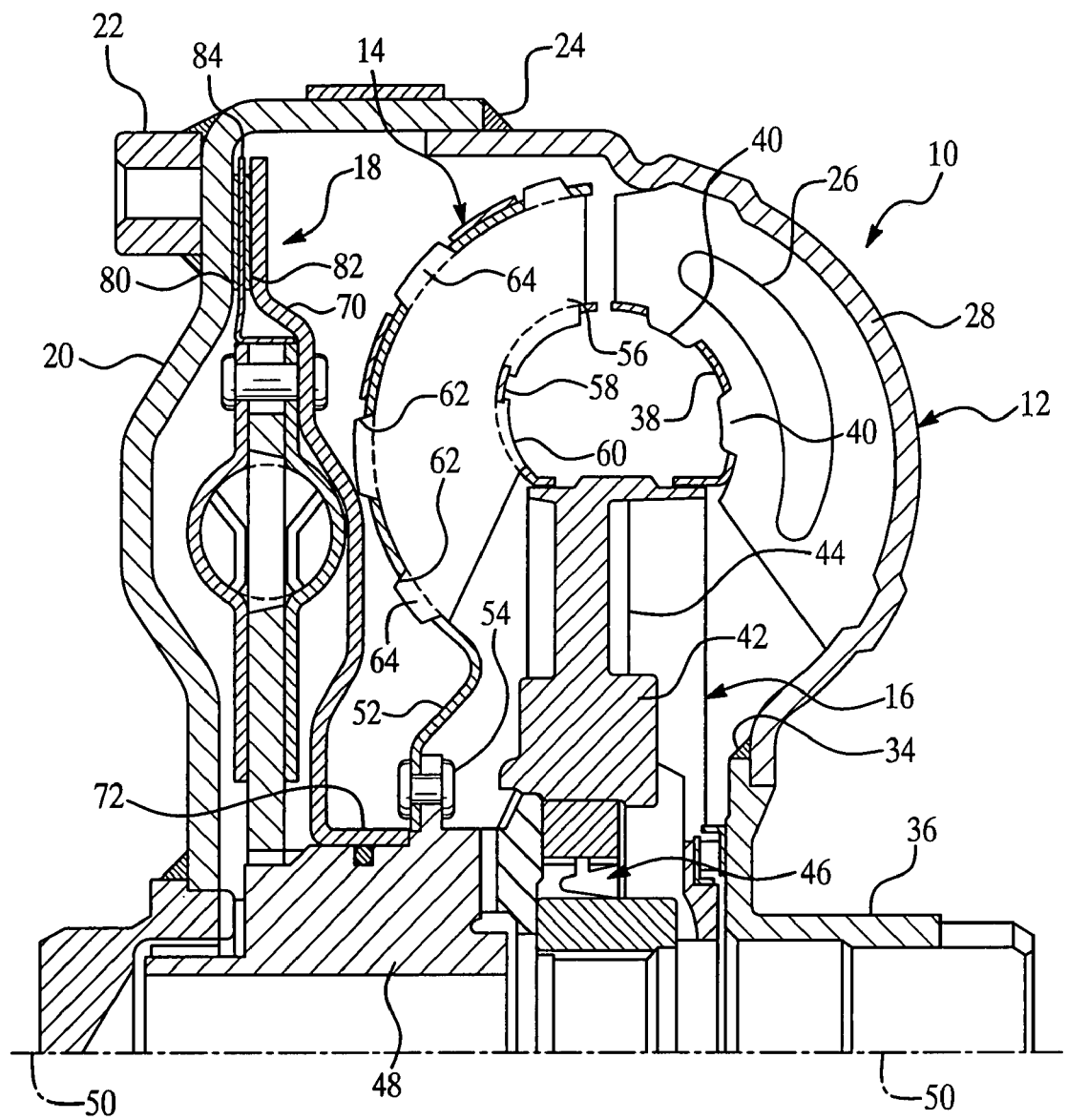
FIG. 2 is a cross sectional side view of a torque converter of the present invention having a lock-up clutch with a floating friction plate.

Referring now to the Figures, where like numerals are used to describe like structure, a hydrodynamic torque converter for translating torque from a prime mover such as an internal combustion engine (not shown) to the input shaft of a transmission is generally shown at 10 in FIG. 2. The transmission may then subsequently distribute this power to one or more wheels (not shown) through other drive train components such as a drive shaft and an axle having a differential (also not shown). While the torque converter illustrated in the Figures is particularly adapted for use with an automotive vehicle, those skilled in the art will understand that the torque converter may be employed in connection with other types of transmissions.

The torque converter 10 includes an impeller assembly, generally indicated at 12, a turbine assembly generally indicated at 14, a stator assembly, generally indicated at 16, and a clutch assembly, generally indicated at 18. Each of these assemblies will be described in greater detail below.

Power is transmitted from the rotating crankshaft (not shown) of the engine to a torque input member or front cover 20 of the torque converter. The front cover 20 may include a plurality of input drive lugs or threaded connectors 22. A rotatable plate (not shown) is typically secured to the front cover member 20 by suitable fastening means such as bolts (not shown) which are received in the connectors 22 as is commonly known in the art. The front cover 20 is secured, typically by welding as indicated at 24, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly spaced, often contoured impeller blades 26 connected to the inside of an impeller shell 28. The impeller shell 28 is fixed, as for example by welding at 34, to an impeller hub or host transmission hydraulic pump drive shaft 36. The impeller hub 36 may drive a pump (not shown) from which fluid is supplied to the hydrodynamic torque converter 10. The impeller blades 26 have an arcuate inner portion, which is fixed to an impeller core 38 through the interaction of wings 40 received in corresponding slots of the core 38.

The stator assembly 16 is interposed between the impeller assembly 12 and the turbine assembly 14 and includes a cast stator hub 42 and a plurality of stator vanes 44 spaced circumferentially about the stator hub 42. The stator assembly 16 includes a one-way clutch assembly, generally indicated at 46, for allowing the stator hub 42 and the stator vanes 44 to rotate or "free wheel" in the direction of rotation of the impeller assembly 12 and the turbine assembly 14. The stator assembly 16 locks in the opposite rotational direction to provide torque multiplication.

The turbine assembly 14 is fluidly connected in driven relationship with the impeller assembly 12. The turbine assembly 14 includes an annular turbine hub 48, which is operatively connected to the input of the transmission and is rotatable about an axis 50. A turbine shell 52 is mounted to the turbine hub 48 via rivets 54 or some other suitable fastener. A plurality of turbine blades 56 are carried by the turbine shell 52. The turbine blades 56 include arcuate inner portions, which are fixed to the turbine core 58 through the interaction of wings 60 received in corresponding slots in the turbine core 58.

The torque converter 10 defines a toroidal flow path for the fluid contained therein. The turbine shell 52 forms a part of the torus defined by the turbine and impeller assemblies 14 and 12 and is thus semi-toroidal in shape. The turbine shell 52 includes rows of radially spaced slots 62 wherein the slots 62 in each of the rows are spaced relative to one another. Likewise, the turbine blades 56 include a series of annularly spaced tabs 64, which correspond to the rows of radially spaced slots 62 in the turbine shell 52. The tabs 64 extend through the slots 62 and are bent at an angle relative to the turbine blades 56 to fix the blades 56 relative to the turbine shell 52.

The clutch assembly 18 illustrated in FIG. 2 is of the type commonly known as a "lock-up clutch" and is supported for rotation with the turbine assembly 14. The lock-up clutch 18 is interposed between the turbine assembly 14 and the torque input member or front cover 20 and is adapted to provide torque translation between the torque input member 20 and the turbine assembly 14. The lock-up clutch assembly 18 includes an annular piston 70 mounted to the turbine assembly 14 at splined connection 72. The lock-up clutch 18 also includes a friction plate 84 that is movably supported relative to the annular piston 70 and is operatively disposed between the annular piston 70 and torque input member 20. A first friction member 80 is operatively disposed between the friction plate 84 and the torque input member 20, and a second friction member 82 is operatively disposed between the friction plate 84 and the annular piston 70. The torque provided by the torque input member 20 is translated from the torque input member 20 through the first friction member 80, the friction plate 84, the second friction member 82, and the annular piston 70 to the turbine assembly 14.

Figure 4:
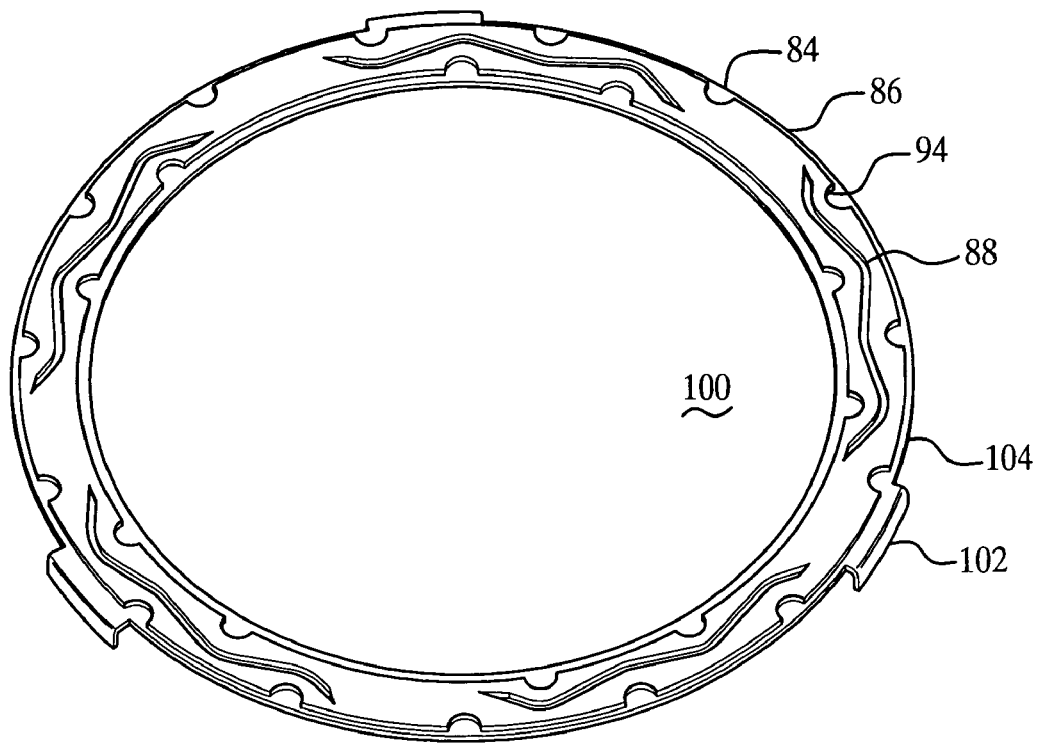
FIG. 4 is a perspective view of the floating friction plate of the present invention.
Figure 3:
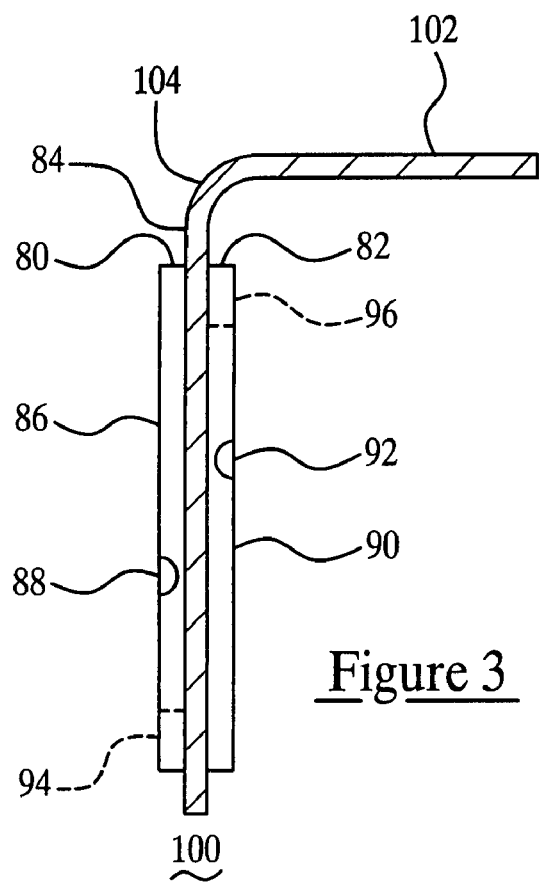
FIG. 3 is a cross sectional side view of the friction plate of the lock-up clutch of the present invention.

As the friction members 80 and 82 operatively slide on the torque input member 20 and the annular piston 14, respectively, heat is generated. The heat must be dissipated to prevent damage to the elements of the lock-up clutch 18. Thus, as shown in FIGS. 3 and 4, the first friction member 80 has a friction face 86 that is in operative contact with the torque input member 20, and the second friction member 82 has a friction face 90 that is in operative contact with the annular piston 70. The friction faces 86 and 90 each have at least one circuitous groove 88 and 92, respectively. The circuitous grooves 88, 92 are adapted to allow a predetermined flow of hydraulic fluid to pass between the friction face 86 and the torque input member 20 to cool the lock-up clutch elements.

Furthermore, a full wetting of the friction interfaces between the elements of the lock-up clutch 18 is required to ensure the proper predetermined frictional interaction between the elements. To this end, the friction members 80 and 82 may also include notches 94 and 96 that are annularly spaced about the friction members 80 and 82 in predetermined positions for wetting the surface of the friction members 80 and 82 in areas that are not effectively wetted by the grooves 88, 92. The notches 94, 96 may be of any geometric shape but as shown in FIG. 4, the notches 94, 96 are in the form of hemispherically shaped voids made on edges of the friction members 80 and 82.

It should be appreciated that the friction members 80 and 82 may be composed of any of a variety of materials that have a specific coefficient of friction. In this regard, the friction members 80 and 82 may also be mounted to the friction plate 84 by any of a number of physical attachment methods. For example, the friction members 80 and 82 may be a coating or film, fluidly applied, or a pre-formed and pre-shaped paper based friction liner or facing bonded by an adhesive to the friction plate 84.

In the preferred embodiment, the first friction member 80 and the second friction member 82 are a paper-based material, adhesive bonded to the friction plate 84. Additionally, the first and second friction members 80 and 82 have different coefficients of friction. Employing friction members 80, 82 with different coefficients of friction allows the lock-up clutch 18 to be finely tuned to separately lock to the torque input member 20 and the annular piston 70 at two predetermined values and different values of torque transfer. In other words, this allows for two points of lock-up in the lock-up clutch 18 as the torque transferred from the torque input member 20 increases. This provides a distinct advantage over conventional designs, by offering greater control of the rate of torque transfer between the torque input member 20 and the torque converter. For example, the lock-up clutch 18 of the torque converter of the present invention may include a second friction member 82 that has a higher coefficient of friction than the first friction member 80. In this case, as the torque transfer across the friction plate 84 increases, the friction plate 84 and the second friction member 82 will lock to the annular plate 70 while the torque input member 20 will continue to slip on the first friction member 80 until the torque transfer increases to a predetermined valve at which the torque input member 20 locks to the first friction member 84.

It should be further appreciated that the lock-up clutch 18 of the torque converter of the present invention may include a first friction member 80 that has a higher coefficient of friction than the second friction member 82. In this case, as the torque transfer across the friction plate 84 increases the friction plate 84 and the first friction member 80 will lock to the torque input member 20 while the annular plate 70 will continuing to slip on the second friction member 82 until the torque transfer increases to a predetermined valve at which the annular plate 70 locks to the friction plate 84. In the preferred embodiment, the second friction member 82 has a higher coefficient of friction than the first friction member 80 so that the friction plate 84 and the second friction member 82 will lock to the annular plate 70 before the torque input member 20 locks to the first friction member 84 of the friction plate 84. Additionally, in the preferred embodiment, the difference of coefficients of friction between the first friction member 80 and the second friction member 82 falls with in a range of 0.12 and 0.35.

As best seen in FIG. 4, the friction plate 84 of the present invention is a flat annular ring having an open center 100 and a plurality of tabs 102 spaced radially about the outer diameter 104 of the friction plate 84. In this manner, as shown in FIG. 2, the friction plate is movably supported relative to the annular piston 70 and is operatively disposed between the annular piston 70 and torque input member 20. The tabs 102 are adapted to fit over the outer diameter 106 of the annular piston 70 such that the friction plate 84 is axially retained about the annular piston 70 but is rotationally unrestrained with respect to the annular piston 70.

Figure 1:
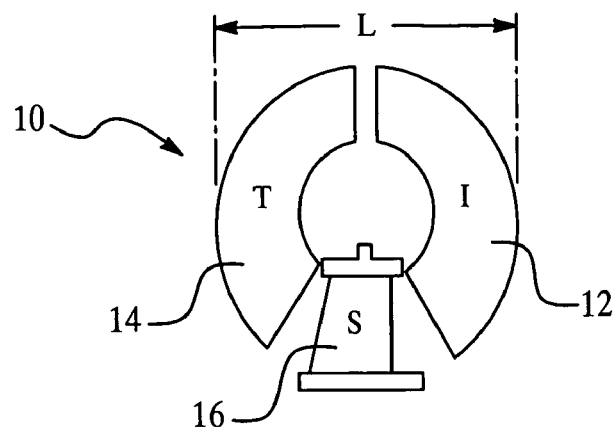
FIG. 1 is a generalized schematic illustration of a torque converter of a type that represents the present invention.
Figure 5:
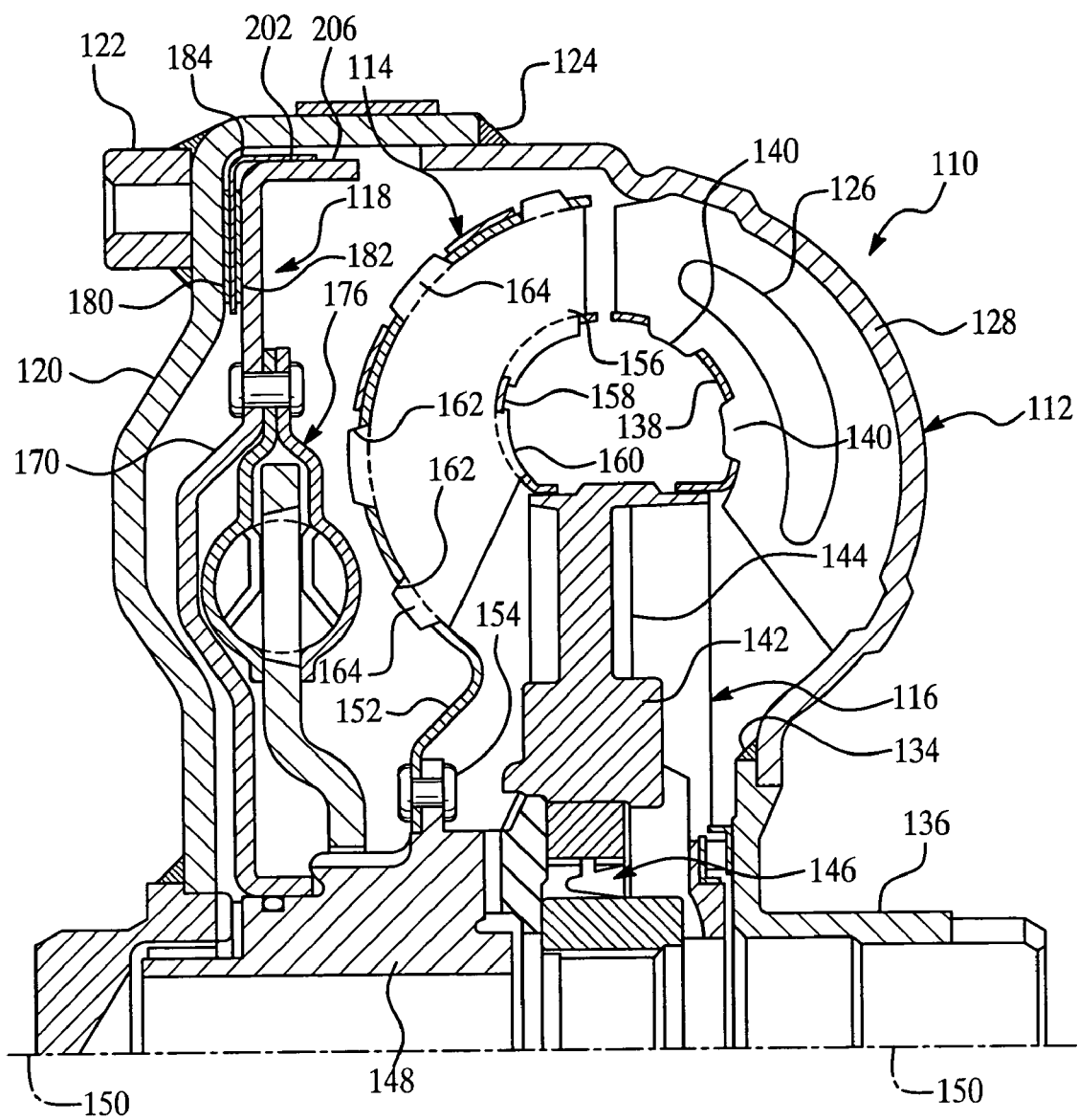
FIG. 5 is a cross sectional side view of another embodiment of the torque converter of the present invention having a lock-up clutch with a floating friction plate and a torsional vibration damper.

Referring now to FIG. 5, where like numerals increased by 100 are used to designate structure like that of FIGS. 1 through 3, a second exemplary embodiment of a hydrodynamic torque converter of the present invention is generally indicated at 110. Thus, from a comparison of the figures, those having ordinary skill in the art will appreciate that the hydrodynamic torque converter illustrated in FIG. 5 has all of the same components as that illustrated in FIG. 2, unless specifically described in greater detail below. All of the similar components have similar reference numerals except that those used to designate the components in this second embodiment have been increased by 100. Accordingly, the similar components will not be described in detail here. The torque converter 110 further includes a torsional vibration damper, generally indicated at 176, that is operatively coupled for rotation with the turbine assembly 114. The torsional vibration damper 176 acts to dampen torsional vibrations due to impact loads and torsional pulsations generated by the primer mover or engine.

This embodiment includes a lock-up clutch 118 interposed between the torsional vibration damper 176 and the torque input member or front cover 120. The lock-up clutch assembly 118 is adapted to provide torque translation between the torque input member 120 and the torsional vibration damper 176. The lock-up clutch 118 includes an annular piston 170 that is mounted to the torsional vibration damper 176 and a friction plate 184 that is movably supported relative to the annular piston 170 and is operatively disposed between the annular piston 170 and torque input member 120. A first friction member 180 is operatively disposed between the friction plate 184 and the torque input member 120, and a second friction member 182 is operatively disposed between the friction plate 184 and the annular piston 170. The torque provided by the torque input member 120 is translated from the torque input member 120 through the first friction member 180, the friction plate 184, the second friction member 182, the annular piston 170, and the torsional vibration damper 176 to the turbine assembly 114.

Figure 6:
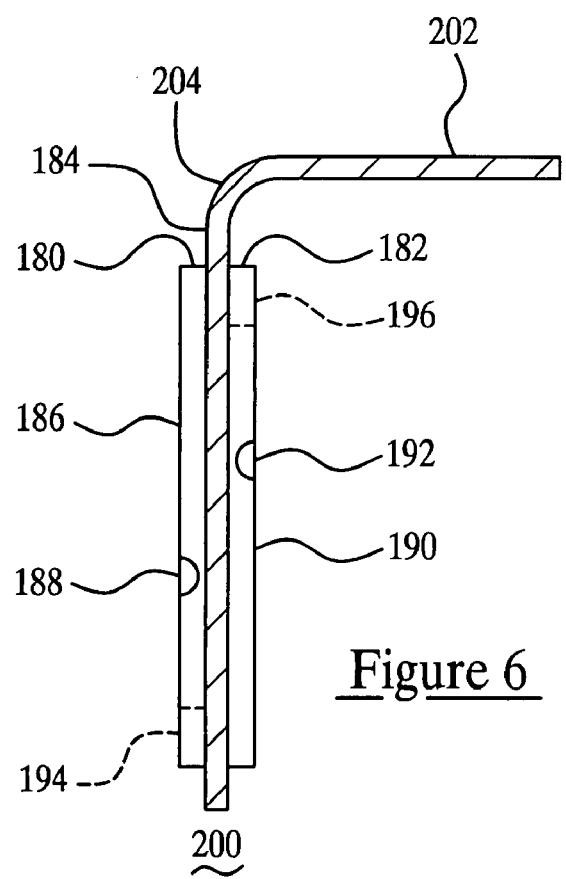
FIG. 6 is a cross sectional side view of a friction plate of a type employed with the lock-up clutch of the present invention as illustrated in FIG. 5.

As the friction members 180 and 182 operatively slide on the torque input member 120 and the annular piston 114, respectively, heat is generated. The heat must be dissipated to prevent damage to the elements of the lock-up clutch 118. Thus, as shown in FIGS. 5 and 6, the first friction member 180 has a friction face 186 that is in operative contact with the torque input member 120, and the second friction member 182 has a friction face 190 that is in operative contact with the annular piston 170. The friction faces 186 and 190 each have at least one circuitous groove 188 and 192, respectively. The circuitous grooves 188, 192 are adapted to allow a predetermined flow of hydraulic fluid to pass between the friction face 186 and the torque input member 120 to cool the lock-up clutch elements.

Furthermore, a full wetting of the friction interfaces between the elements of the lock-up clutch 118 is required to ensure the proper predetermined frictional interaction between the elements. To this end, the friction members 180 and 182 may also include notches 194 and 196 that are annularly spaced about the friction members 180 and 182 in predetermined positions for wetting the surface of the friction members 180 and 182 in areas, which are not effectively wetted by the grooves 188, 192. The notches 194, 196 may be of any geometric shape but as shown in FIG. 4, the notches 194, 196 are in the form of hemispherically shaped voids made on edges of the friction members 180 and 182.

It should be appreciated that the friction members 180 and 182 may be any composed of a variety of materials that have a specific coefficient of friction. In this regard, the friction members 180 and 182 may also be mounted to the friction plate 184 by any of a number of physical attachment methods. For example, the friction members 180 and 182 may be a coating or film, fluidly applied, or a pre-formed and pre-shaped paper based friction liner or facing bonded by an adhesive to the friction plate 184.

In this embodiment, the first friction member 180 and the second friction member 182 are a paper-based material, adhesive bonded to the friction plate 184. Additionally, the first and second friction members 180 and 182 have different coefficients of friction. Employing friction members 180, 182 with different coefficients of friction allows the lock-up clutch 118 to be finely tuned to separately lock to the torque input member 120 and the annular piston 170 at two predetermined and different values of torque transfer. In other words, this allows for two points of lock-up in the lock-up clutch 118 as the torque transferred from the torque input member 120 increases. This provides a distinct advantage over conventional designs, by offering greater control of the rate of torque transfer between the torque input member 120 and the transmission. For example, the lock-up clutch 118 of the torque converter of the present invention may include a second friction member 182 that has a higher coefficient of friction than the first friction member 180. In this case, as the torque transfer across the friction plate 184 increases, the friction plate 184 and the second friction member 182 will lock to the annular plate 170 while the torque input member 120 will continue to slip on the first friction member 180 until the torque transfer increases to a predetermined valve at which the torque input member 120 locks to the first friction member 184.

More specifically, it should be appreciated that the lock-up clutch 118 of the torque converter of the present invention may include a second friction member 182 that has a higher coefficient of friction than the first friction member 180. In this case, as the torque transfer across the friction plate 184 increases, the friction plate 184 and the second friction member 182 will lock to the annular plate 170 while the torque input member 120 will continue to slip on the first friction member 180 until the torque transfer increases to a predetermined valve at which the torque input member 120 locks to the first friction member 184.

It should be further appreciated that the lock-up clutch 118 of the torque converter of the present invention may include a first friction member 180 that has a higher coefficient of friction than the second friction member 182. In this case, as the torque transfer across the friction plate 184 increases the friction plate 184 and the first friction member 180 will lock to the torque input member 120 while the annular plate 170 will continuing to slip on the second friction member 182 until the torque transfer increases to a predetermined valve at which the annular plate 170 locks to the friction plate 184.

In this embodiment, the second friction member 182 has a higher coefficient of friction than the first friction member 180 so that the friction plate 184 and the second friction member 182 will lock to the annular plate 170 before the torque input member 120 locks to the first friction member 180 of the friction plate 184. Additionally, in the preferred embodiment, the difference of coefficients of friction between the first friction member 180 and the second friction member 182 falls with in a range of 0.12 and 0.35.

As shown in FIGS. 5 and 6, the friction plate 184 is a flat annular ring having an open center 200 and a plurality of tabs 202 spaced radially about the outer diameter 204 of the friction plate 184. The tabs 202 are adapted to fit over the outer diameter 206 of the annular piston 170 such that the friction plate 184 is axially retained about the annular piston 170 but is rotationally unrestrained with respect to the annular piston 170.

Figure 9:
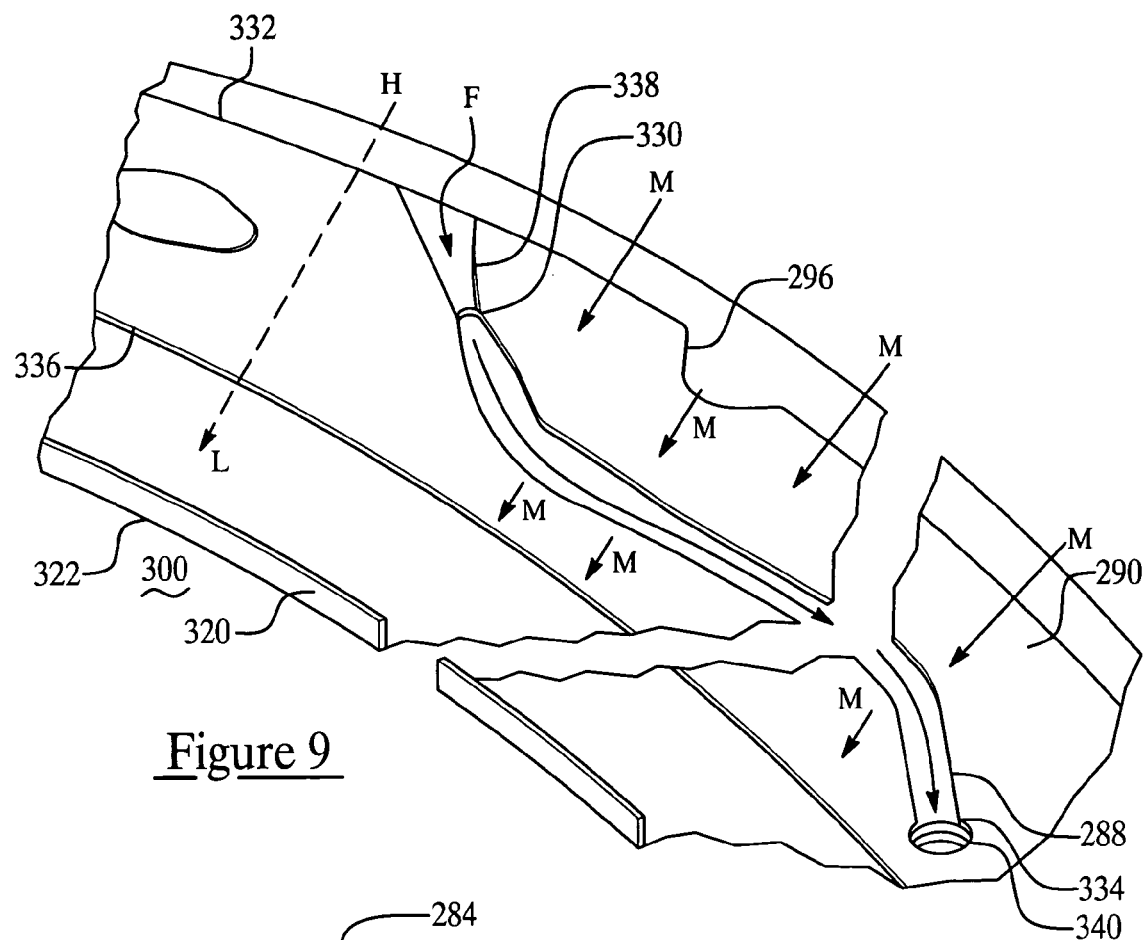
FIG. 9 is a detailed view of a portion of the slipping face of the embodiment of the floating friction plate illustrated in FIGS. 7 and 8.
Figure 10:
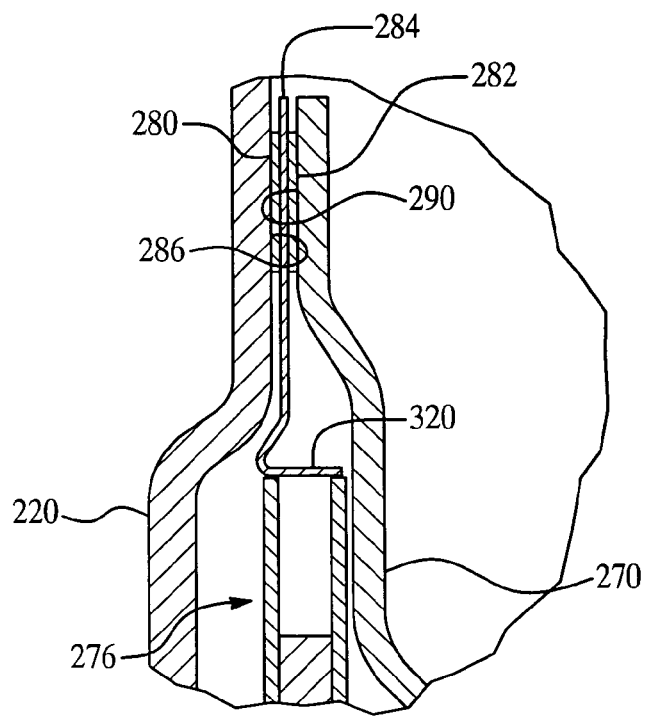
FIG. 10 is a cross sectional side view of the floating friction plate illustrated in FIGS. 7, 8, and 9 as employed with a torsional vibration damper.
Figure 11:
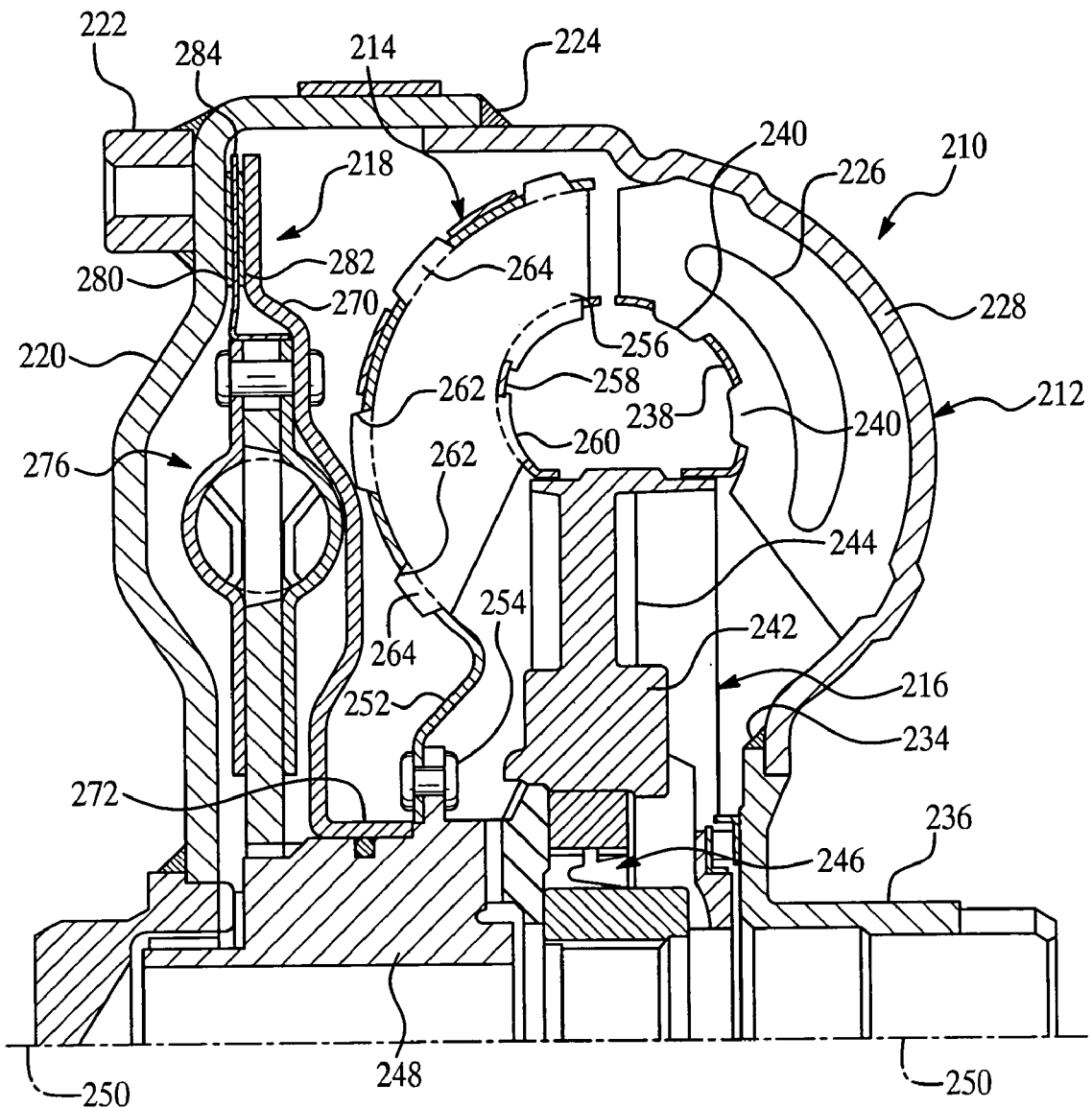
FIG. 11 cross sectional side view of another embodiment of the torque converter of the present invention having a lock-up clutch with a floating friction plate and a torsional vibration damper as illustrated in FIGS. 7 through and 10 as employed with a torsional vibration damper.

Referring now to FIGS. 7 through 11, where like numerals incremented by 200 are used to designate like structure, another exemplary embodiment of a hydrodynamic torque converter of the present invention is generally indicated at 210 (FIG. 11). Thus, from the comparison of the figures, those having ordinary skill in the art will appreciate that the hydrodynamic torque converter illustrated in FIG. 11 has all of the same components as that illustrated in FIG. 2 unless specifically described in greater detail below. All of the similar components have similar reference numerals except that those used to designate the components in this third embodiment have been increased by 200. Accordingly, similar components will not be described in detail here. The torque converter 210 further includes a torsional vibration damper, generally indicated at 276, that is operatively coupled for rotation with the turbine assembly 214. The torsional vibration damper 276 acts to dampen torsional vibrations due to impact loads and torsional pulsations generated by the primer mover or engine.

This embodiment includes a lock-up clutch 218 interposed between the torsional vibration damper 276 and the torque input member or front cover 220. The lock-up clutch assembly 218 is adapted to provide torque translation between the torque input member 220 and the torsional vibration damper 276. The lock-up clutch 218 includes an annular piston 270 that is mounted to the torsional vibration damper 276 and a friction plate 284 that is movably supported relative to the annular piston 270 and is operatively disposed between the annular piston 270 and torque input member 220. As best shown in FIG. 10, a first friction member 280 is operatively disposed between the friction plate 284 and the torque input member 220, and a second friction member 282 is operatively disposed between the friction plate 184 and the annular piston 270. The torque provided by the torque input member 220 is translated from the torque input member 220 through the first friction member 280, the friction plate 284, the second friction member 282, the annular piston 270, and the torsional vibration damper 276 to the turbine assembly 214.

Figure 7:
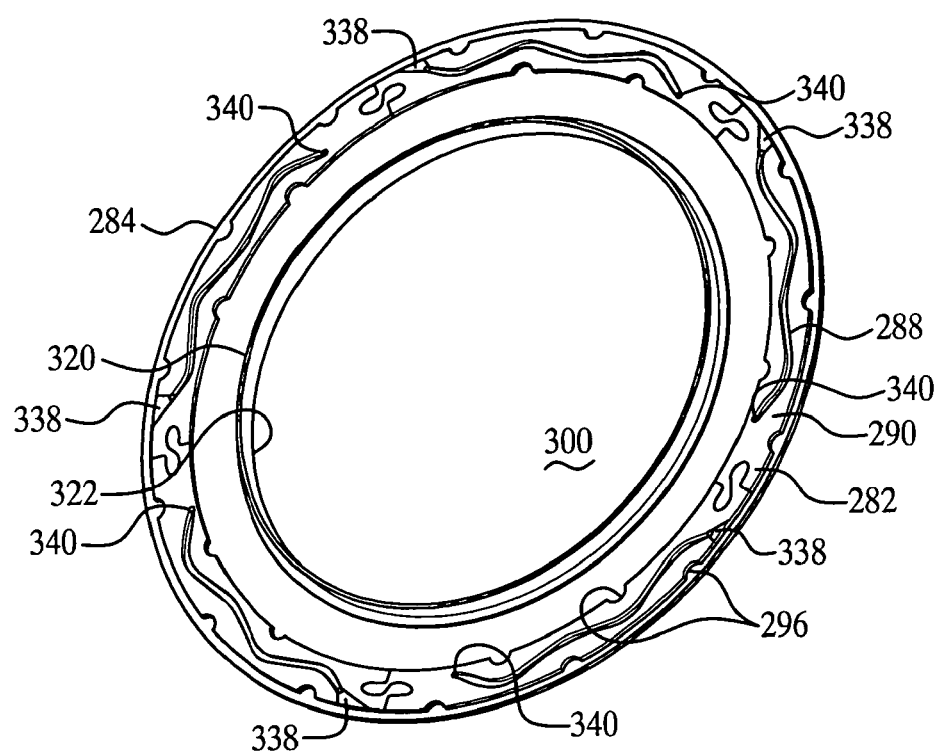
FIG. 7 is a perspective view of another embodiment of the floating friction plate of the present invention illustrating the slipping face of the plate.
Figure 8:
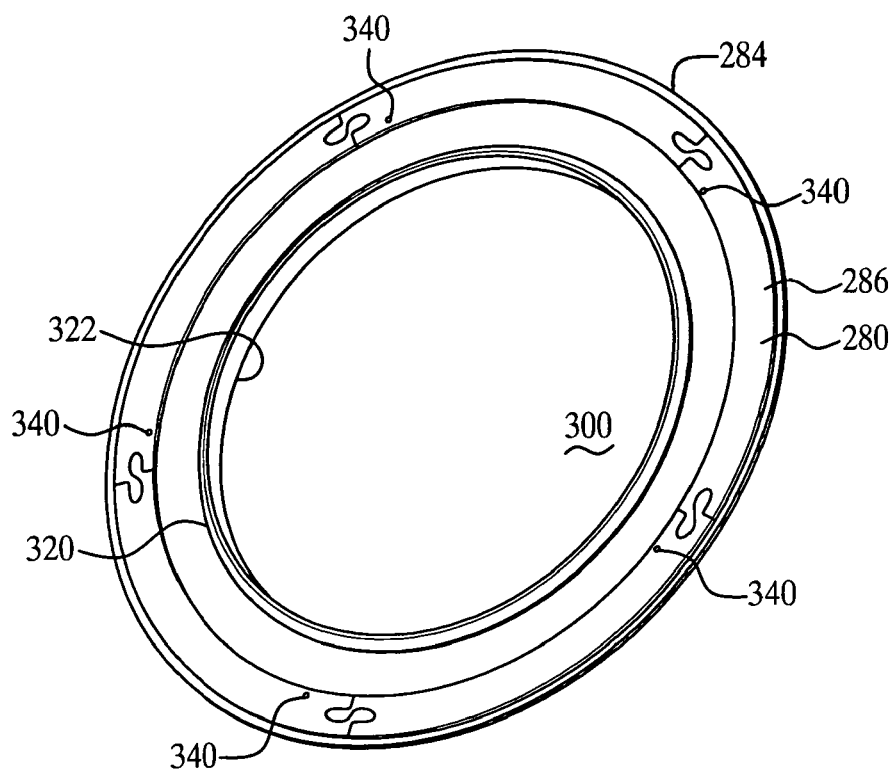
FIG. 8 is a perspective view of the locking face of the embodiment of the floating friction plate illustrated in FIG. 7.

As the friction members 280 and 282 operatively engage the torque input member 220 and the annular piston 214, respectively, heat is generated. The heat must be dissipated to prevent damage to the elements of the lock-up clutch 218. Thus, as shown in FIGS. 10 and 11, the first friction member 280 has a friction face 286 that is in operative contact with the torque input member 220, and the second friction member 282 has a friction face 290 that is in operative contact with the annular piston 270. In this embodiment, as best shown in FIG. 7, friction face 290 has at least one circuitous groove 288. The circuitous grooves 288 are adapted to allow a predetermined flow of hydraulic fluid to pass between the friction face 286 and the torque input member 220 to cool the lock-up clutch elements. Furthermore, the shape and routing of the circuitous grooves 288 provides a predetermined amount of frictional interaction between the friction face 286 and the torque input member 220 so that a specific torque translation occurs.

A full wetting of the friction contact interfaces between the elements of the lock-up clutch 218 is required to ensure the proper predetermined frictional interaction between the elements. To this end, the second friction member 282 may also include notches 296 that are annularly spaced about the second friction member 282 in predetermined positions. The notches 296 may be of any geometric shape, but as shown in FIG. 7 are in the form of hemispherically shaped voids made on edges of the second friction member 282.

It should be appreciated that the friction members 280 and 282 may be composed of a variety of materials that have a specific coefficient of friction. In this regard, the friction members 280 and 282 may also be mounted to the friction plate 284 by any of a number of physical attachment methods. For example, the friction members 280 and 282 may be a coating or film, fluidly applied, or a pre-formed and pre-shaped paper based friction liner or facing bonded by an adhesive to the friction plate 284.

In this embodiment, the first and second friction members 280, 282 are made from a paper-based material, adhesive bonded to the friction plate 284. Additionally, the first and second friction members 280, 282 have different coefficients of friction. Employing friction members 280, 282 with different coefficients of friction, along with specifically forming the circuitous grooves 288 on the second friction member 282 allows the lock-up clutch 218 to be finely tuned to separately lock to the torque input member 220 and the annular piston 270 at two predetermined and different values of torque transfer. In other words, this allows for two points of lock-up in the clutch 218 as the torque transferred from the torque input member 220 increases.

This provides a distinct advantage over conventional designs by offering greater control of the rate of torque transfer between the torque input member 220 and the transmission. For example, the lock-up clutch 218 of the torque converter of the present invention may include a second friction member 282 that has a higher coefficient of friction than the first friction member 280. In this case, as the torque transfer across the friction plate 284 increases, the friction plate 284 and the second friction member 282 will lock to the annular plate 270 while the torque input member 220 will continue to slip with respect to the first friction member 280 until the torque transfer increases to a predetermined valve at which the torque input member 220 locks to the first friction member 284.

It should be further appreciated that the lock-up clutch 218 of the torque converter of the present invention may also include a first friction member 280 that has a higher coefficient of friction than the second friction member 282. In this case, as the torque transfer across the friction plate 284 increases, the friction plate 284 and the first friction member 280 will lock to the torque input member 220 while the annular plate 270 will continuing to slip with respect to the second friction member 282 until the torque transfer increases to a predetermined valve at which the annular plate 270 locks to the friction plate 284.

In this embodiment, the first friction member 280 has a higher coefficient of friction than the first friction member 280 so that the friction plate 284 and the first friction member 280 will lock to the torque input member 220 before the annular plate 270 locks to the second friction member 282 of the friction plate 284. Additionally, in the preferred embodiment, the difference of coefficients of friction between the first friction member 180 and the second friction member 182 falls with in a range of 0.12 and 0.35.

As shown in FIGS. 7 through 11, the friction plate 284 is a flat annular ring having an open center 300 and an axial ridge 320 formed at the inner circumference 322 of the annular ring. As best shown, in FIGS. 10 and 11, the axial ridge 320 is adapted to be disposed over the outer diameter of the vibration damper 276 such that the friction plate 284 is axially supported and rotatably unrestrained with respect to the vibration damper 276.

In this embodiment, the friction face 290 of the second friction member 282 includes additional features that allows for tuning the frictional interaction between the second frictional member 282 and the annular piston 270 to a wider range with greater incremental distinction. This has the advantage of further allowing a finer and more precise tuning of the predetermined torque transfer across the lockup clutch 218. More specifically, as shown in detail in FIG. 9, the circuitous grooves 288 include an outermost end 330 formed in the friction face 290 of the second friction member 282 that is proximate to the outer diameter 332 of the second friction member 282. The circuitous grooves 288 also have an innermost end 334 formed in the friction face 290 of the second first friction member 282 that is proximate to the inner diameter 336 of the second friction member 282 such that the circuitous grooves 288 provide a path for the flow of hydraulic fluid along the contact interface of the friction face 290 with the annular piston 270 between the outer diameter 332 and the inner diameter 336.

The circuitous grooves 288 further include a lead-in area 338 that is formed between the outer diameter 332 of the friction face 290 and the outermost end 330 of the circuitous groove 288. The lead-in area 338 has a predetermined depth to provide a specific amount of hydraulic fluid to flow from the outer diameter 332 of the second friction member 282 into the circuitous groove 288. The friction plate 284 also includes openings 340 through the annular ring that are adapted to allow for the flow of hydraulic fluid from the contact interface between the second friction member 282 to the contact interface between the first friction member 280 and the torque input member 220. In the preferred embodiment, the openings 340 are disposed in the annular ring at the innermost end 334 of the circuitous grooves 288.

Generally speaking, during the operation of the torque converter 210, the hydraulic fluid within the converter case about the lock-up clutch is at a higher relative pressure near the outer diameter of the friction plate 284 than that of the hydraulic fluid near the inner diameter of the friction plate 284. This is represented in FIG. 9 by the capital letters "H" and "L". This difference in the relative pressures of the hydraulic fluid causes the fluid to attempt to migrate from the higher pressure area "H" to the lower pressure area "L". This is indicated in FIG. 9 by the dotted line between the "H" and "L" and smaller lines designated with an "M" for migrating flow. To provide specific predetermined control over the amount of flow between the outer diameter area to the inner diameter area, which influences the frictional interaction of the clutch element, the present invention includes the above mentioned lead-in area 338, and openings 340. The lead-in areas 338 and the openings 340 in conjunction with the particular choice of frictional material and the specific routing of the circuitous grooves 288 provide control over the amount of groove directed flow "F", which either supplements or reduces the migrating flow "F". In this manner, the frictional interaction between the second frictional member 282 and the annular piston 270, and thereby the torque transfer, can be particularly and distinctly predetermined.

In this manner, the costly and inefficient manufacturing and operational approaches of the prior art with regard to torque converter assemblies having a lock-up clutch are overcome by the present invention. The torque converter of the present invention having a floating friction plate with two separate friction members may be easily constructed in a separate process to protect the bonded friction material and can be installed in the transmission late in the assembly process, which allows much improved protection of the bonded friction material. Further, the friction plate of the present invention is retained within the torque converter without welding and is floated between the elements of the locking clutch to prevent exposing the friction material to damage or misalignment. In addition, since the floating friction plate of the present invention is not fixed to the annular piston or vibration damper it is capable of accounting for wear and misalignment within the torque converter. Still further, the circuitous grooves, lead-in areas, and opening from the first to the second friction members provide the advantage of being able to tune the clutch to very precise and specific lock-up and slip parameters. Finally, the floating friction plate of the torque converter of the present invention is a flat annular ring and not a full disc, which has greatly reduced mass to reduce parasitic losses and improve torque converter efficiency.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A torque converter having a lock-up clutch for translating torque between a prime mover and a transmission, said torque converter comprising:

a torque input member and an impeller assembly operatively coupled for rotation with said torque input member;

a turbine assembly fluidly connected in driven relationship with said impeller assembly;

a torsional vibration damper operatively coupled for rotation with said turbine assembly; and a lock-up clutch assembly interposed between said torsional vibration damper and said torque input member, said lock-up clutch assembly adapted to provide torque translation between said torque input member and said torsional vibration damper, said lock-up clutch assembly including an annular piston mounted to said torsional vibration damper, a friction plate movably supported relative to said annular piston and operatively disposed between said annular piston and said torque input member, said friction plate including a flat annular ring having an open center with an axial ridge formed at the inner circumference of said annular ring, said axial ridge adapted to fit over the outer diameter of said vibration damper so that said friction plate is axially supported and rotatably unrestrained with respect to said vibration damper, a first friction member operatively disposed between said friction plate and said torque input member, and a second friction member operatively disposed between said friction plate and said annular piston such that the torque provided by said torque input member is translated from said torque input member through said first friction member, said friction plate, said second friction member, said annular piston, and said torsional vibration damper to said turbine assembly.

2. A torque converter as set forth in claim 1 wherein said friction plate is a flat annular ring having an open center and a plurality of tabs spaced radially about the outer diameter of said friction plate, said tabs adapted to fit over the outer diameter of said annular piston so that said friction plate is axially retained and rotatably unrestrained with respect to said annular piston.

3. A torque converter as set forth in claim 1 wherein said first friction member has a friction face in contact with said torque input member, said friction face having at least one circuitous groove adapted to allow a predetermined flow of hydraulic fluid to pass between said friction face and said torque input member.

4. A torque converter as set forth in claim 1 wherein said second friction member has a friction face in contact with said annular piston, said friction face having at least one circuitous groove adapted to allow a predetermined flow of hydraulic fluid to pass between said friction face and said annular piston.

5. A torque converter as set forth in claim 1 wherein said first friction member and said second friction member have different coefficients of friction.

6. A torque converter as set forth in claim 5 wherein said second friction material has a higher coefficient of friction than said first friction material so that as said torque transfer across said friction plate increases said friction plate will lock to said annular plate first while continuing to slip on said torque input member until said torque transfers increases to a predetermined value at which said friction plate locks to said torque input member.

7. A torque converter as set forth in claim 5 wherein said first friction material has a higher coefficient of friction than said second friction material so that as said torque transfer across said friction plate increases said friction plate will lock to said torque input member first while continuing to slip on said annular plate until said torque transfers increases to a predetermined value at which said friction plate locks to said annular plate.

8. A torque converter as set forth in claim 5 wherein said difference of coefficients of friction between said first friction member and said second friction member falls within a range of 0.12 and 0.35.

9. A torque converter as set forth in claim 1 wherein said second friction member has a friction face in contact with said annular piston, said friction face having at least one circuitous groove adapted to allow a predetermined flow of hydraulic fluid to move along the contact interface between said second friction face and said annular piston.

10. A torque converter as set forth in claim 9 wherein said circuitous groove includes an outermost end disposed in the friction face of the second friction member that is proximate to the outer diameter of said second friction member and an innermost end disposed in the friction face of the second friction member that is proximate to the inner diameter of said second friction member such that said circuitous groove provides a path for the flow of hydraulic fluid along said contact interface of said friction face with said annular piston between the outer diameter and the inner diameter of said friction face.

11. A torque converter as set forth in claim 10 wherein said friction face of said second friction member further includes a lead-in area that is formed between said outer diameter of said friction face of said second friction member and said outermost end of said circuitous groove, said lead-in area having a predetermined depth to provide a specific amount of hydraulic fluid to flow from said outer diameter of said second friction member into said circuitous groove.

12. A torque converter as set forth in claim 11 wherein said friction plate includes at least one opening through said annular ring, said opening adapted to allow for the flow of hydraulic fluid from the contact interface between said second friction member to the contact interface between said first friction member and said torque input member.

13. A torque converter as set forth in claim 11 wherein said opening is disposed in said annular ring at said innermost end of said circuitous groove.

14. A torque converter as set forth in claim 1 wherein said first friction member and said second friction member have different coefficients of friction.

15. A torque converter as set forth in claim 14 wherein said second friction material has a higher coefficient of friction than said first friction material so that as said torque transfer across said friction plate increases said friction plate will lock to said torque input member first while continuing to slip on said annular piston until said torque transfers increases to a predetermined value at which said friction plate locks to said annular piston.

16. A torque converter as set forth in claim 14 wherein said first friction material has a higher coefficient of friction than said second friction material so that as said torque transfer across said friction plate increases said friction plate will lock to said annular piston first while continuing to slip on said torque input member until said torque transfers increases to a predetermined value at which said friction plate locks to said torque input member.

17. A torque converter as set forth in claim 14 wherein said difference of coefficients of friction between said first friction member and said second friction member falls within a range of 0.12 and 0.35.

* * * * *